(12) United States Patent
Benjamin et al.

(10) Patent No.: US 7,441,023 B2
(45) Date of Patent: Oct. 21, 2008

(54) METHOD AND APPARATUS FOR MODELING AND ANALYZING MPLS AND VIRTUAL PRIVATE NETWORKS

(75) Inventors: Shai Benjamin, Dobbs Ferry, NY (US); Patricia Florissi, Briarcliff Manor, NY (US); William Kuhhirte, Trinity, FL (US); Lida He, Sleepy Hollow, NY (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/949,415

(22) Filed: Sep. 24, 2004

(65) Prior Publication Data

US 2005/0071130 A1    Mar. 31, 2005

Related U.S. Application Data

(60) Provisional application No. 60/505,802, filed on Sep. 25, 2003.

(51) Int. Cl.
*G06F 15/16* (2006.01)
(52) U.S. Cl. ............... 709/223; 709/221; 709/222; 709/224
(58) Field of Classification Search ............. 709/223, 709/224, 220, 221, 222; 370/254
See application file for complete search history.

(56) References Cited

U.S. PATENT DOCUMENTS

| | | | |
|---|---|---|---|
| 5,528,516 A | 6/1996 | Yemini | |
| 5,661,668 A | 8/1997 | Yemini | |
| 6,223,220 B1 * | 4/2001 | Blackwell et al. | 709/223 |
| 6,249,755 B1 | 6/2001 | Yemini | |
| 6,874,022 B1 * | 3/2005 | Carew et al. | 709/224 |
| 6,990,518 B1 * | 1/2006 | Secer | 709/223 |
| 2002/0186664 A1 * | 12/2002 | Gibson et al. | 370/254 |

OTHER PUBLICATIONS

E.Rosen & Y. Rekhter, RFC 2547-BGP/MPLS VPNS, Internet Network Working Group, Mar. 1999.
E. Rosen, RFC 3031-Multiprotocol Label Switching Architecture, Internet Network Working Group, Jan. 2001.

* cited by examiner

*Primary Examiner*—William C. Vaughn, Jr.
*Assistant Examiner*—Djenane Bayard
(74) *Attorney, Agent, or Firm*—Krishnendu Gupta; Robert Kevin Perkins; Joseph J. D'Angelo

(57) ABSTRACT

A method and apparatus for representing a network and performing operations on the represented network are disclosed. The method comprises the steps of creating at least one configuration non-specific object class associated with components of the network, creating at least one configuration non-specific representation of relationships among associated object classes, representing a behavior relationship among the object classes based on the representations of the relationships among the object classes and analyzing properties of the network based on the behavior relationships. In aspects of the invention, the represented network may be an MPLS network, a VPN or a combined MPLS-VPN.

41 Claims, 9 Drawing Sheets

FIG. 3b

|   | CUST1 | CUST2 |
|---|-------|-------|
| A | ✓ | ✓ |
| B | ✓ | ✓ |
| C | ✓ | — |

FIG. 4a

|      | LSP A-F$_1$ | LSP A-D | LSP D-F | LSP A-F$_2$ | LSP A-F$_3$ |
|------|-------------|---------|---------|-------------|-------------|
| A    | X | X |   | X | X |
| B    | X | X |   |   | X |
| C    |   |   | X | X | X |
| D    |   | X | X | X | X |
| E    | X |   | X |   | X |
| F    | X |   |   | X | X |
| A--B | X | X |   |   | X |
| A--C |   |   |   | X |   |
| B--D |   | X |   |   | X |
| B--E | X |   |   |   |   |
| C--D |   |   | X | X | X |
| C--E |   |   | X |   | X |
| D--F |   |   |   | X |   |
| E--F | X |   | X |   | X |

FIG. 4b

|            | SERVICE 1 | SERVICE 2 | SERVICE 3 |
|------------|-----------|-----------|-----------|
| LSP A-F$_1$ |   |   | X |
| LSP A-D    |   | X |   |
| LSP D-F    |   | X |   |
| LSP A-F$_2$ | X |   |   |
| LSP A-F$_3$ |   | X |   |

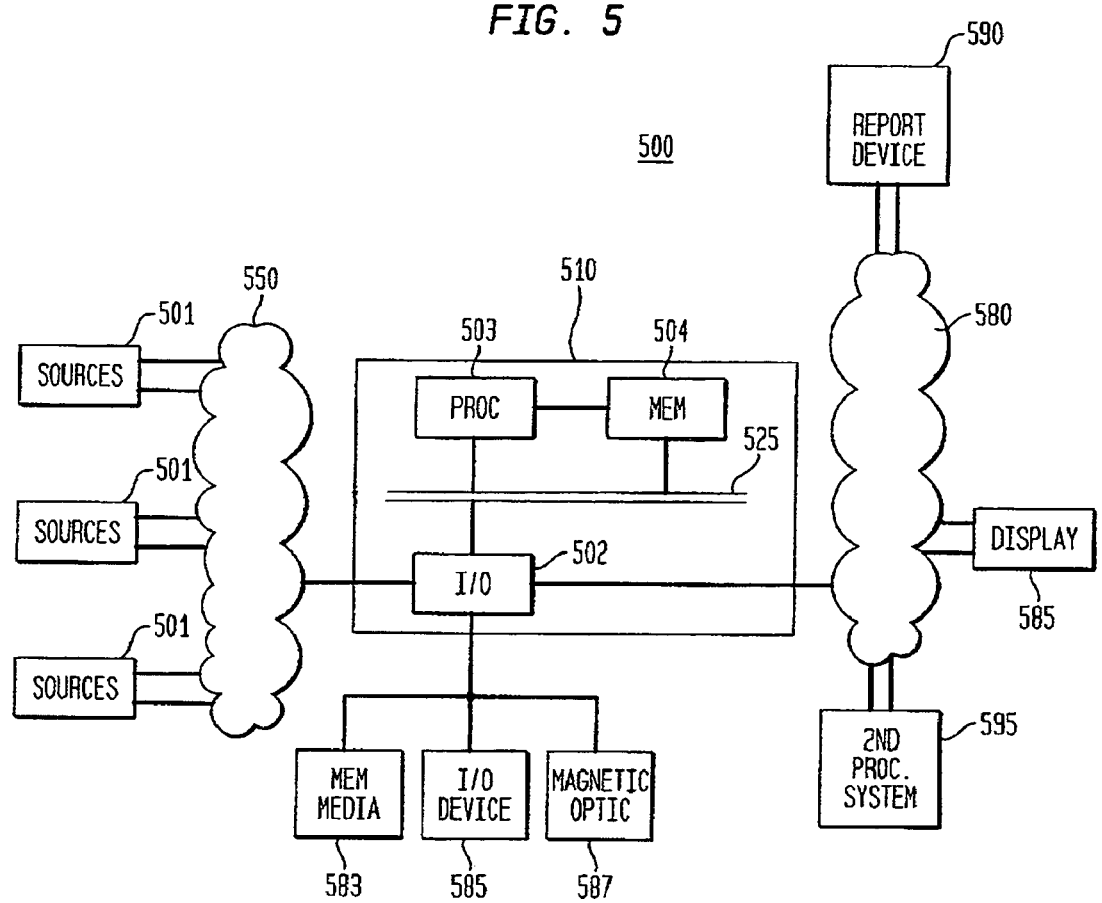

METHOD AND APPARATUS FOR MODELING AND ANALYZING MPLS AND VIRTUAL PRIVATE NETWORKS

CLAIM OF PRIORITY

This application claims the benefit, pursuant to 35 USC §119(e), of the earlier filing date of U.S. Provisional Patent Application Ser. No. 60/505,802, entitled "Model-Based Discovery of Multi-Protocol Label Switching Virtual Private Networks, filed on Sep. 25, 2003, the contents of which are incorporated by reference herein.

RELATED APPLICATIONS

This application is related to concurrently-filed:

U.S. patent application Ser. No. 10/950,150, entitled "Model-Based Method and Apparatus for Determining Virtual Private Network Topologies;" and U.S. patent application Ser. No. 10/949,589, entitled "Model-Based Method and Apparatus for Determining MPLS Network Properties," the contents of both of which are incorporated by reference herein.

FIELD OF THE INVENTION

The invention relates generally to computer networks, and more specifically to methods and apparatus for modeling and analyzing Model-Based Multi-Protocol Label Switching (MPLS) networks and Virtual Private Networks (VPNs).

BACKGROUND OF THE INVENTION

The concepts, terms, and acronyms of Virtual Private Networks (VPN) are well-known in the art. For example, the memorandum entitled *BGP/MPLS VPNs*, E. Rosen and Y. Rekhter, RFC 2547, March 1999, Internet Engineering Task Force (IETF), is an example of the literature regarding VPNs. Similarly, the concepts, terms, and acronyms of MPLS networks are well-known in the art. For example, the memorandum entitled *RFC 3031-Multiprotocol Label Switching Architecture*, E. Rosen, A. Viswanathan, and R. Callon, RFC 3031, January 2001, Internet Engineering Task Force (IETF), is an example of the literature regarding MPLS networks.

However, the ability to analyze MPLS networks and VPNs has been limited by the network models that have been employed. For example, one model uses a Common Information Model (CIM) that defined objects and relationships. (see *Common Information Model: Implementing the Object Model for Enterprise Management*, Bumpus, et al., John Wiley & Sons, December 1999, ISBN: B00007FY8X). This model is limited by the pre-defined and standard objects and relationships defined in the Common Information Model (CIM). For example, one cannot easily capture the relationship between a VPN Routing and Forwarding Table (VRF) and a Route Target (RT).

In a second model, the definition of MPLS and VPN Management Information Bases (MIBs) are established. (See, for example, *SNMP, SNMPv2, SNMPv3, and RMON 1 and 2 (3rd Edition*, William Stallings, Addison-Wesley Pub Co, December 1998, pages 71-162, ISBN: 0201485346). However, MIBs typically do not capture relationships between objects. For example the MPLS end-to-end Label-Switched Path (LSP) is difficult to represent explicitly in a MIB.

The lack of a systematic model specifically suited for the MPLS and VPN object classes and their relationships limits several forms of important analysis. Hence there is a need in the industry for a method and system that overcomes known deficiencies in analyzing MPLS networks and Virtual Private Networks.

SUMMARY OF THE INVENTION

A method and apparatus for representing a network and performing operations on the represented network are disclosed. The method comprises the steps of creating at least one configuration non-specific object class associated with components of the network, creating at least one configuration non-specific representation of relationships among associated object classes, representing a behavior relationship among the object classes based on the representations of the relationships among the object classes and analyzing properties of the network based on the behavior relationships. In aspects of the invention, the represented network may be an MPLS network, a VPN or a combined MPLS-VPN.

DETAILED DESCRIPTION OF THE FIGURES

FIG. 3b illustrates an exemplary behavior representation of the network shown in FIG. 3a in accordance with the principles of the invention;

FIGS. 4a and 4b illustrate exemplary behavior representations associated with the network shown in FIG. 1c, in accordance with the principles of the invention;

FIG. 5 illustrates a system for implementing the processing shown herein.

Figure 1A:
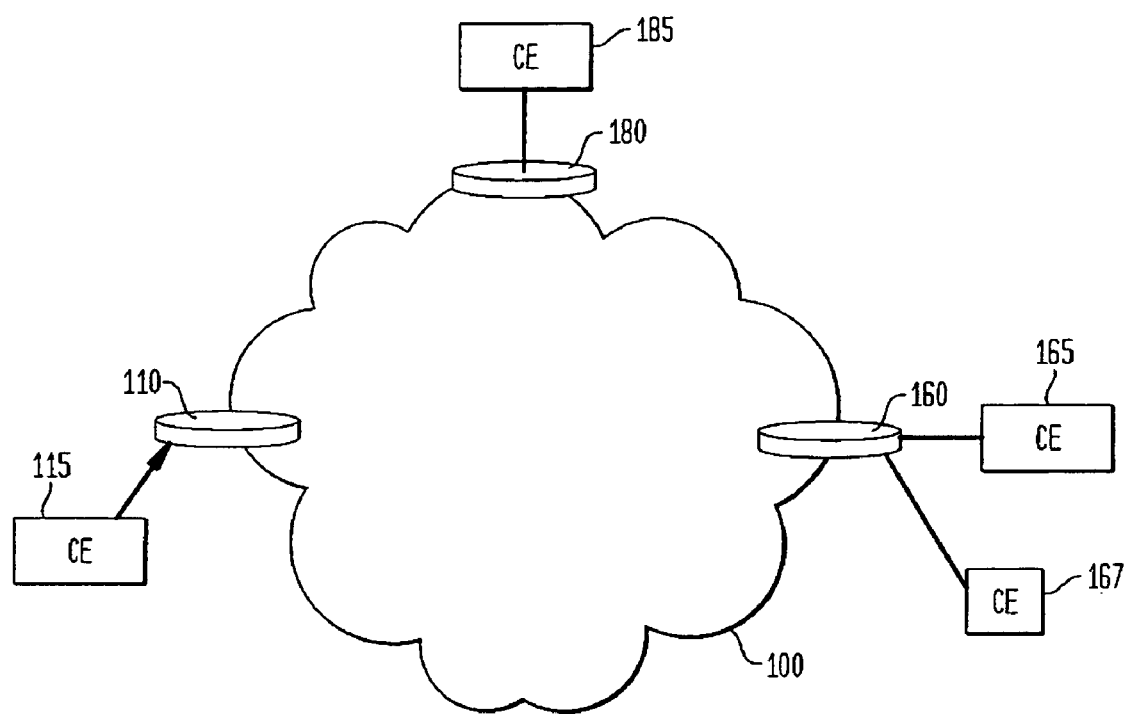
FIG. 1a illustrates an exemplary conventional Virtual Private Network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1a illustrates an exemplary representation of a virtual private network 100 composed of components, referred to as provider edge routers (PE), 110, 160 and 180 that represent the means for providing information items to, and receiving information items from, network 100. Also shown are Customer Edge (CE) nodes or routers 115, 165, 167 and 185, which are in communication with corresponding provider edge nodes 110, 160 and 180. The CE nodes 115, 165, 167 and 185 represent are components or routers located at the customer premises that are directly connected, at either a network Layer 2 or Layer 3 level (of the OSI stack) to the ingress and egress provider edge routers 110, 160 and 180. Internal routers, which are not shown, are responsible for converting the packet or frame structure from the one used to communicate with CE routers 115, 165, 167, and 185 to the packet or frame structure used internally by an associated private network.

A CE router or node is typically connected to only one provider edge router or node. However, as shown in this illustrative case, provider edge router 160 is connected to CE router 165 and CE router 167. Hence, CE router 185, for example, may communicate privately with CE router 165 and/or 167. The communication between the CE nodes and the PE nodes may take place using any Layer 2 or Layer 3 network protocol.

VPN routing and addressing structures are created for each customer in the PE and internal nodes (not shown), and designate the path assigned to the customer. VPN Routing and Forwarding Tables (VRFs) are a well-known means for creating virtual private networks. The VRFs exchange routes using, for example, Multiprotocol Border Gateway Protocol (MP-BGP). The typical attributes of a VRF instance include a name, associated interfaces, route-distinguisher, import route-targets, export route-targets, and a routing table. RouteTargets (RTs) are identifiers associated with a set of routes through the network 100. The identifiers are used by the VRFs to control the importing or the exporting of routes to other VRFs. Each VRF, thus, can export or import routes or paths via a list of export or import RTs. In this illustrative case, CE 115 for example, may communicate privately with CE 167 by the appropriate selection of VRFs in each edge router or node and the not shown internal routers or nodes. In one aspect of the invention, a Route-Distinguisher may also be specified that provides a distinguishing characteristic for the specific route. This distinguishing characteristic is used when duplicate addresses are encountered.

Figure 1B:
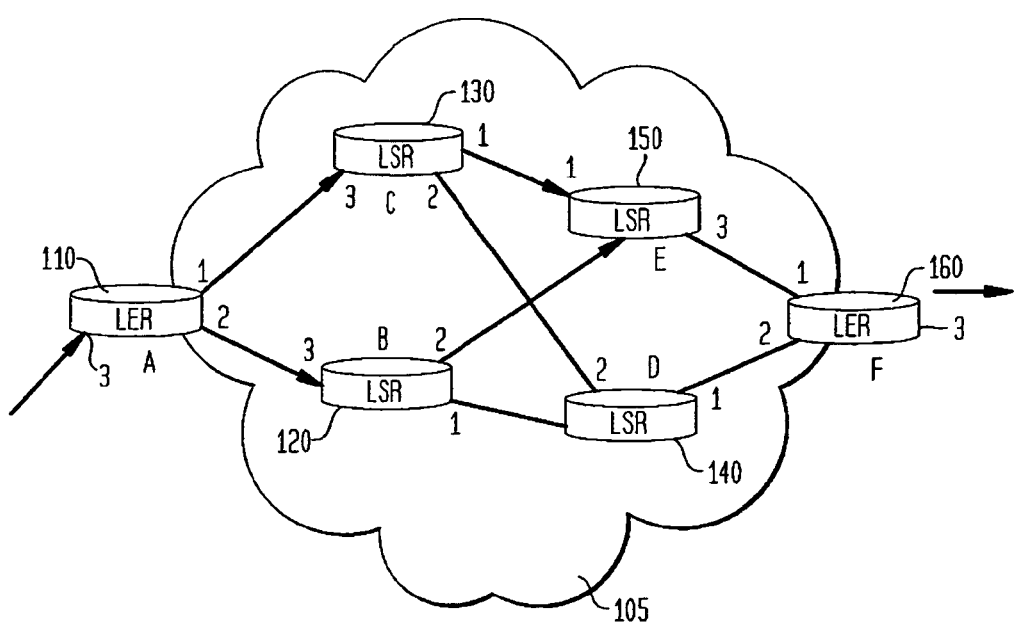
FIG. 1b illustrates an exemplary conventional MPLS network.

FIG. 1b illustrates a conventional MPLS network in an IP network 105, which is composed of Label Edge Routers (LER) 110 and 160, which are similar to those shown in FIG. 1a, and network internal Label Switch Routers (LSR) 120, 130, 140 and 150, which are identified as B, C, D, and E, respectively. LERs 110 and 160 are identified as A and F, respectively. As is also shown, each router contains three ports for transmitting and/or receiving data or information items from a connected router. For example, LSR 120 is shown to receive data from LER 110 on its input port 3 and transmit data to LSR 150 via its outgoing port 2 and to LSR 140 via its outgoing port 1. Although LSR 120 is discussed and shown with regard to a unidirectional transmission, it would be recognized that the routers and the links between routers may be configured for bi-direction transmission and reception,—i.e., LER 120, port 2 is both an input and output port.

The Label Switch Routers, in this case, 120-150, represent the core MPLS nodes and contain forwarding tables that map the incoming label and incoming port information into an outgoing label and outgoing port. The incoming port is the identifier of the network interface at which a packet arrived while the outgoing port is the identifier of the network interface through which the packet will proceed to the next node. The Label Switch Routers base their forwarding decisions on the MPLS label and incoming port combination, without referring at any Layer 2 or Layer 3 through 7 header (of the OSI stack). In some cases, only the MPLS label is used in making the forwarding decision. In such cases, incoming packets arriving on different incoming ports with the same label will be treated the same. Using a label swapping operation, the provider node replaces the MPLS label in the incoming packet with a new MPLS label in the outgoing packet and sends the new packet via the outgoing port. The path between one node and a second node is thus created by a sequence of MPLS labels and is referred to as a Label Switched Path (LSP).

The last router, i.e., Label Edge Router 160, in an LSP is a special case in that a new MPLS label need not be added to the address to forward the information. Thus, LER 160 merely removes the MPLS shim and sends the resulting packet via the designated outgoing port. This functionality is well-known in the art and referred to a penultimate hop popping or PHP.

Figure 1C:
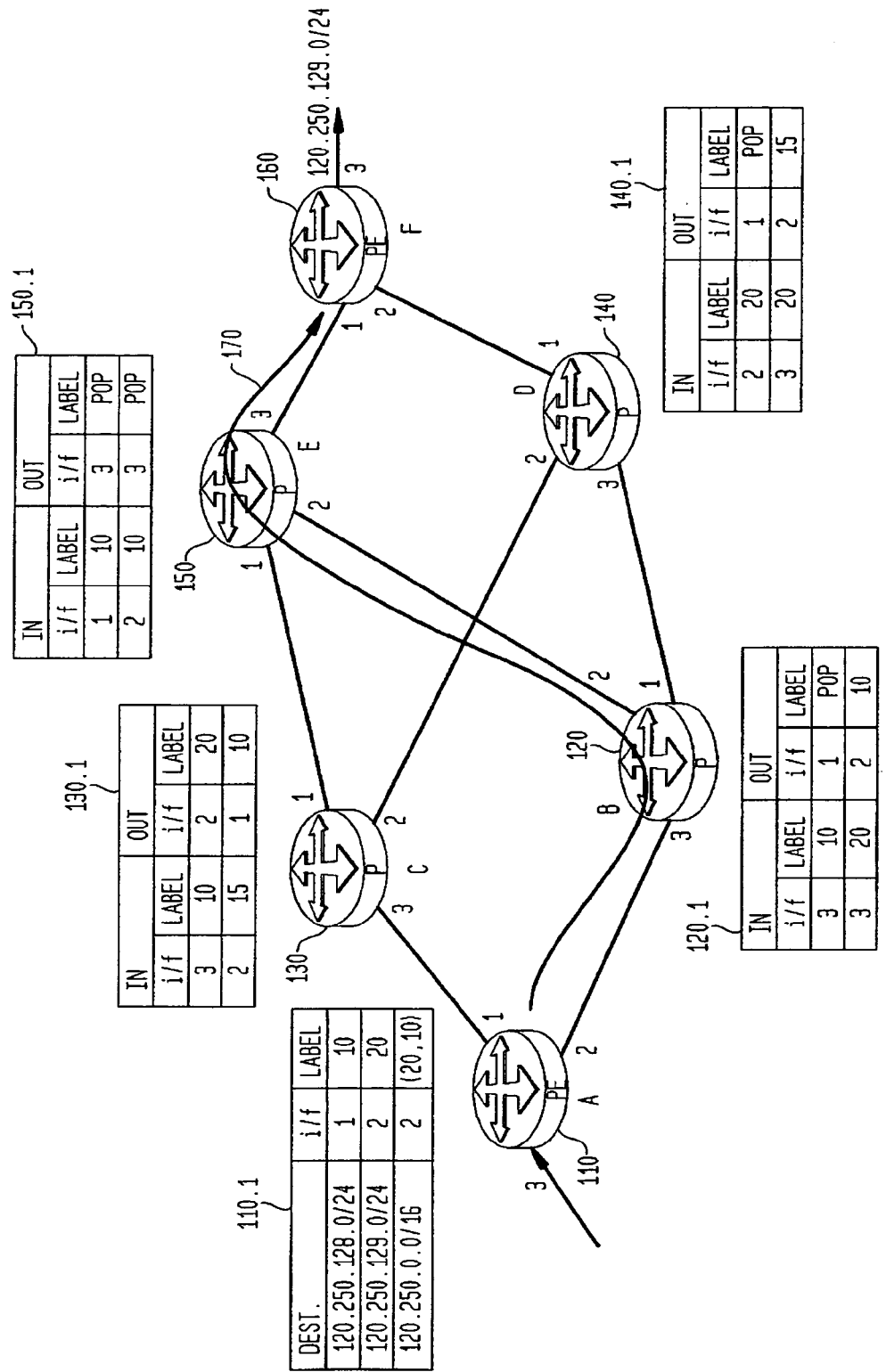
FIG. 1c illustrates the use of MPLS forwarding tables associated with the network shown in FIG. 1b.

FIG. 1c illustrates, for each router shown in FIG. 1b, exemplary forwarding table relationships between the input port/MPLS label and the outgoing port/MPLS label to use for selected destination IP addresses. In this illustrated case, three services are provided and correspond to the three ranges of IP addresses shown. The services may be used by a single user or by other users. Thus, information associated with the range of IP addresses 120.250.129.0/24 provided on LER 110, port 3 proceeds via LSP 170 through routers 110, 120, 150 and 160 based on routing/labeling data items contained in label binding routing table 110.1 and label forwarding tables 120.1, and 150.1. The destination Label Edge Router 160 does not require a routing table in this direction to retrieve the desired destination address, as it is the last node in LSP 170. Also shown is that table 150.1 includes a "pop" label for information received on port 1, label 10. Use of a "pop" label is well-known to indicate that the node applying the "pop" label is the penultimate node and information items are forwarded to the ultimate node via the specified outgoing port. Table 110.1 further illustrates the use of MPLS label stack in that labels 10 and 20 are assigned to information destined for IP addresses in the range of 120.250.0.0/16. The use of the MPLS label stack is well-known in the art and need not be discussed in detail herein.

Figure 2A:
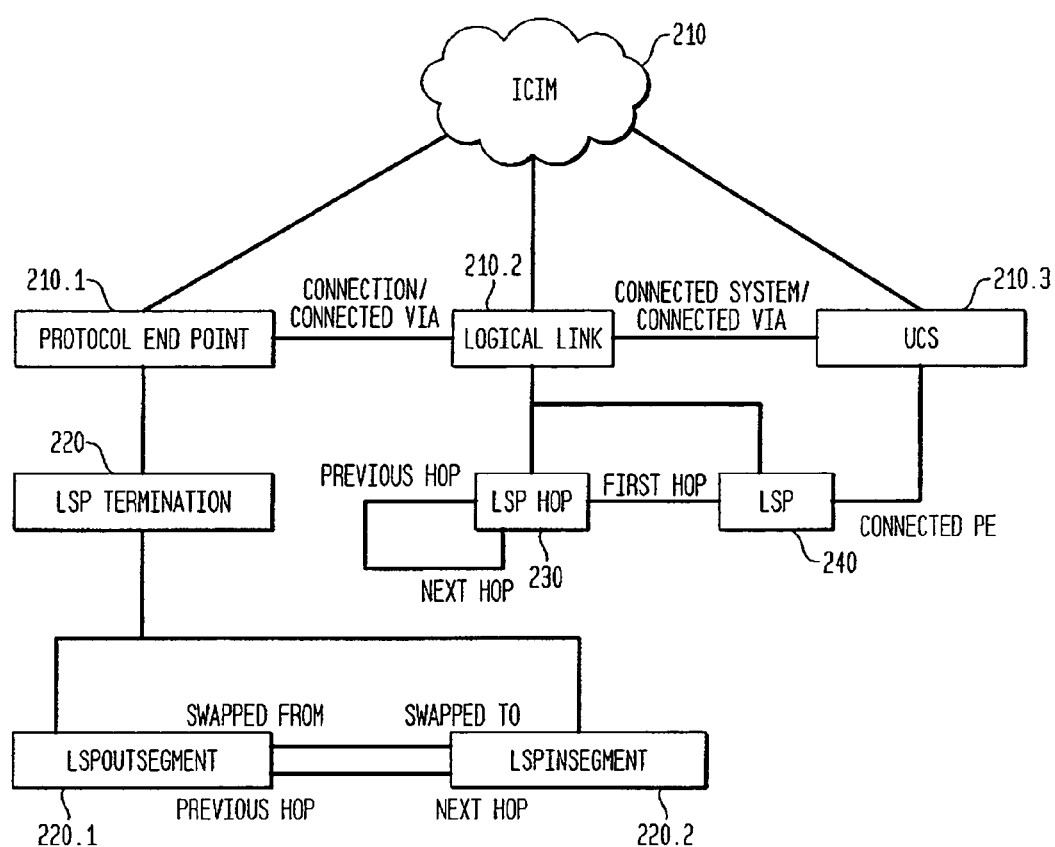
FIG. 2a illustrates an exemplary model representation of a MPLS network in accordance with the principles of the invention.
Figure 2B:
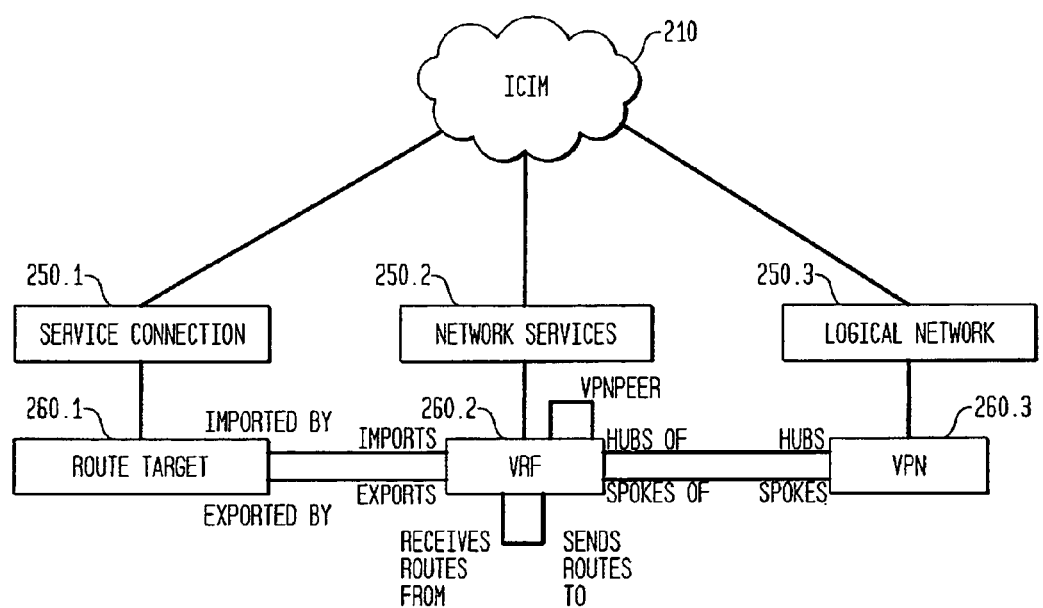
FIG. 2b illustrates an exemplary model representation of a Virtual Private Network in accordance with the principles of the invention.

FIGS. 2a and 2b illustrate exemplary abstract models of an MPLS network and a VPN, to capture characteristics of the MPLS network and VPN in accordance with the principles of the invention. The MPLS and VPN models are extensions of known network models 210, such as the SMARTS® InCharge™ Common Information Model (ICIM), or similarly defined or pre-existing CIM-based model. SMARTS and InCharge are trademarks of System Management ARTs, Inc., having a principle place of business in White Plains, N.Y., USA. CIM models are known to represent selected ones of the physical network components, e.g., nodes, routers, computers, disk drives, etc., and/or logical network components, e.g., software, application software, ports, disk drive designation, etc., by defining object classes that are a representation of the modeled components. Those network components that are selected for representation in the model are also referred to as managed components. The representation of the managed components further includes aspects or properties of the modeled component. Similarly, relationships between the managed components may also be represented and contained in the model.

With regard to the ICIM shown in FIG. 2a, this model defines object classes such as ProtocolEndpoint 210.1, LogicalLink 210.2 and UCS 210.3 (Unitary Computer System) that are representative of generic concepts of protocol endpoint, logical link and unitary computer systems, respectively. Further, the Protocol Endpoint 210.1 and the Logical Link 210.2 are related in each direction by a ConnectedVia/ConnectedTo relationship.

In accordance with the principles of the invention with regard to modeling MPLS networks, as shown in FIG. 2a, additional object classes are defined as:

LSPTermination 220, which represents incoming or outgoing labels in the MPLS forwarding table;

LSPHop 230, which represents a uni-directional logical link between two devices or components in an MPLS network across which MPLS-labeled packets are sent; and LSP 240, which represents a concatenation of LSPHops and represents the "label switched path" taken by labeled packets across an MPLS network.

In addition, representations of the MPLS labels may be defined as:

LSPInSegment 220.1; and

LSPOutSegment 220.2, wherein, these classes represent the incoming and outgoing labels, respectively, in the MPLS forwarding/routing table and are subclasses of the LSPTermination 220 class.

The LSPInSegment 220.1 and LSPOutSegment 220.2 objects are related by two pairs of relationships: PreviousHop/NextHop and SwappedFrom/SwappedTo. Relationship PreviousHop/NextHop relates two different LSPTerminations 220 that are on opposite ends of an LSPHop and have the same label attribute. Relationship object class SwappedFrom/SwappedTo relates an LSPInSegment object class, representing an incoming label, with an associated LSPOutSegment object class, representing the outgoing label. These labels are swapped for or changed to on the same device or component.

Base model UCS object class 210.2 represents generic computer systems, such as nodes, servers or routers. UCS 210.2 hosts LSPTermination points and is related to LSPs via the ConnectedPE relationship that defines a LER or LSR, i.e., router, unitary computer system. The base model further defines the relationship ConnectedSystems/ConnectedVia between objects classes UCS and LogicalLink.

Referring now to FIG. 2b, the ICIM defines object classes such as ServiceConnection 250.1, NetworkService 250.2, and LogicalNetwork 250.3 that are representative of generic concepts of service connections, network services, and logical networks, respectively.

In accordance with the principles of the invention with regard to modeling VPN networks, as shown in FIG. 2b, additional object classes are defined as:

RouteTarget 260.1 is selected as a type of service connection;

VRF 260.2 is designated as a type of network service; and

VPN 260.3 is designated as a type of logical network.

The VPN model 260 further illustrates the relationship between RouteTarget 260.1 and VRFs 260.2 which may be expressed in the object classes referred to as ImportedBy/Imports and ExportedBy/Exports. Similarly, the relationship between VRFs 260.2 and the VPN 260.3 may be expressed in the object classes HubsOf/Hubs and SpokesOf/Spokes.

Figure 2C:
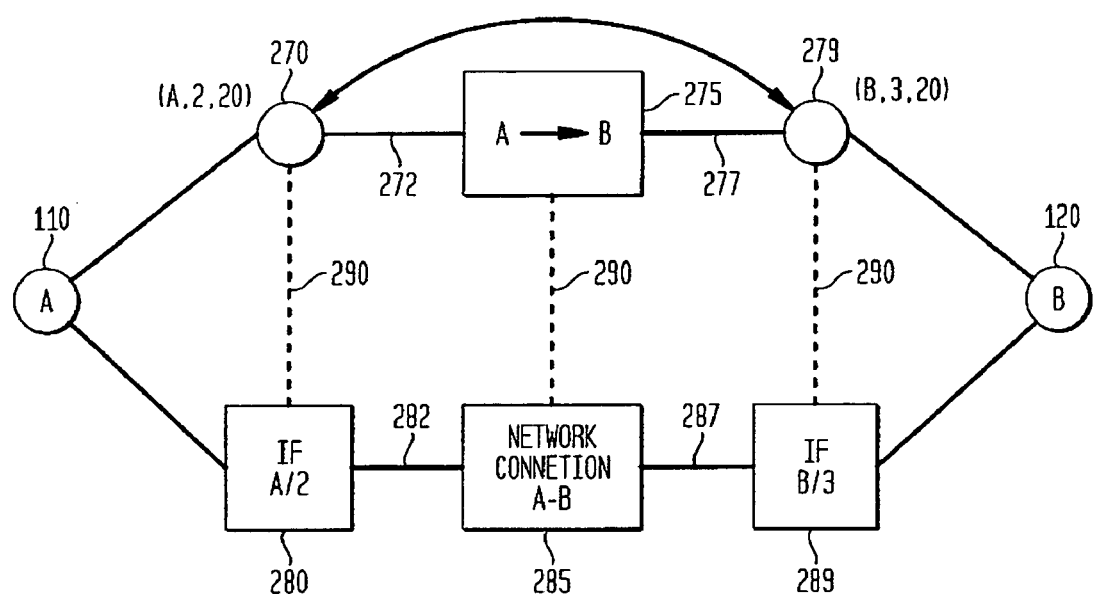
FIG. 2c illustrates an instantiation of the model with associated network elements.

FIG. 2c illustrates instances of object classes and their relationships with regard to the model representing the network. More specifically, and referring to FIG. 1c, node 110, identified as "A" is connect to interface 280, which, in this case, is associated with outgoing port 2. Interface 280 is connected via a medium, e.g., electrical, optical, wireless, etc., to a network connection 285 between nodes 110 and 120, identified as "B." Network connection 285, similarly may be a medium such as electrical, optical, wireless, etc. Network connection 285 is further connected, via medium 287 to interface 289 and subsequently to port 3 of node 120.

Model representation of components may be "layered-over" corresponding components in the physical network, as represented by dotted lines 290. In the example shown, the model includes connector 270, which is representative of interface 280, and is shown to possess a ConnectedVia 272 relationship to logical link 275. Link 275 is representative of network connection 285 and has a ConnectedVia 277 relationship to connector 279, which is representative of interface 289.

It would be recognized by those skilled in the art that the information to populate or determine instances of the object classes, i.e., representation of components, and the relationship between components, i.e., representation of component relationships, of the models defined herein may be pre-loaded or predetermined or may be determined dynamically by importation, discovery or provided by one or more the sources of such information, e.g., Simple Network Management Protocol (SNMP) MIBs, MPLS-LSR-MIB, MPLS forwarding tables, MPLS-VPN-MIB. Similarly, manual commands such as Command Line Interface (CLI) at network devices, Show commands that retrieve and display information regarding forwarding-table, VRFs, BGP and MBGP sessions, may be used to provide information to populate the object classes shown in FIGS. 2a and 2b. Each of these sources of information are representative of communications that may occur dynamically over the physical network that the model overlays, i.e., layered over, and should not be considered the only methods to dynamically populate the object classes shown.

Figure 3A:
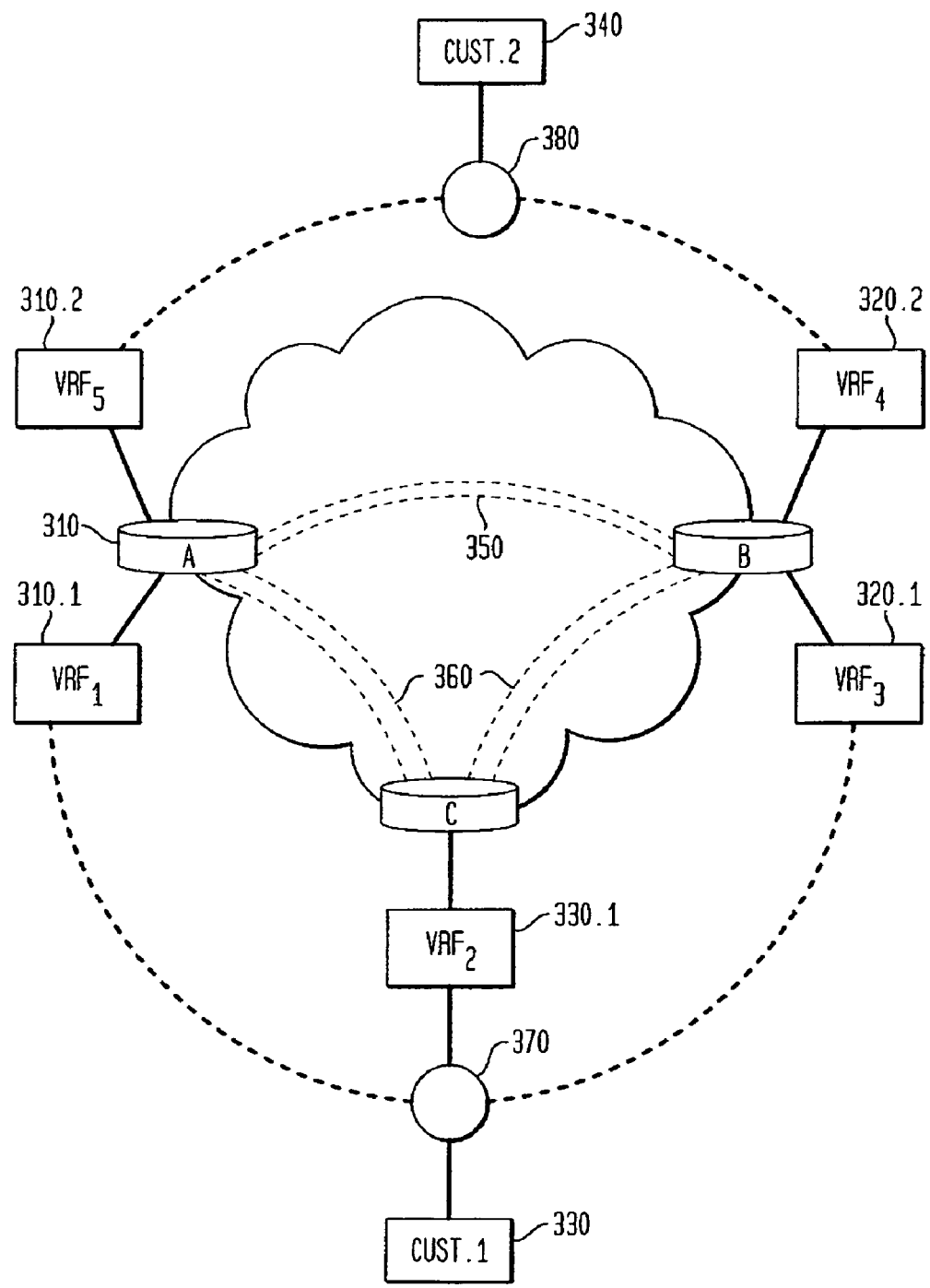
FIG. 3a illustrates an exemplary network model overlaying a physical VPN.

FIGS. 3a and 3b illustrate an exemplary network and an example of a behavior relationship in accordance with the principles of the invention. FIG. 3a illustrates exemplary network 300 containing Edge nodes A, 310, B, 320 and C, 330. Two private networks are shown in that route 350 illustrates a private communication path for one user and route 360 illustrates a private communication path for a second user.

Virtual Private Networks VPN-1, 370 and VPN-2, 380 represent instances in object class 260.3 that are representative of the two private networks shown. Further, object classes Customer 1, 330 and Customer 2, 340 are related to VPN-1 and VPN-2 respectively. Also, shown are VRF1, 310.1 and VRF5, 310.2, which are hosted by node 310, VRF2, 330.1, which is hosted by node 330 and VRF3, 320.1 and VRF4, 320.2, which are hosted by node 320. VRF1-VRF5 represent instances of object class 260.2 (FIG. 2b). In this illustrative example, VRF1, 310.1, VRF2, 330.1 and VRF3, 320.1 are associated with VPN-1, 370 and VRF4, 320.2 and VRF5, 310.2 are associated with VPN-2, 380.

Although only a single VPN is shown associated with each user, it would be recognized that each user may be associated with multiple VPNs. Multiple VPNs may be utilized based on factors such as communication link or node fault, performance, cost, etc. Thus, the user or customer may select an alternate VPN to accommodate a detected failure in one communication path, or based on the type of data transmitted, e.g., high-speed or low-speed, or cost of transmission, e.g., day/night rates, or organizational, e.g. one VPN for traffic associated with one business unit and another VPN for traffic associated with a different business unit, etc. Selection of an alternate VPN may be determined in view of results of one or more analysis operations that may be performed, as will be more fully discussed.

FIG. 3b illustrates an exemplary behavior relationship of the network(s) shown in FIG. 3a, with regard to nodes and service provided. In this exemplary behavior relationship a problem or event that occurs in nodes A, 310, or B, 320 causes service to customers 1, 330 and 2, 340 to be impacted, whereas a problem in node C, 330 impacts the service to customer 1, 330 but has no impact on the service provided to customer 2, 340. In this case, properties of the nodes as represented by object classes are propagated through the relationships among the object to create a behavior relationship. For example, a failure in a node has an adverse or negative impact on associated nodes and, thus, node failure may be propagated through associated objects and elevated to the higher levels within the model representation. Although the exemplary behavior relationship is discussed with regard to a node failure, it would be recognized that similar behavior relationships may be determined with regard to causality, performance, cost, etc.

FIGS. 4a and 4b illustrates similar exemplary network behavior relationships with regard to the network shown in FIG. 1c, in accordance with the principles of the invention. FIG. 4a illustrates the behavior relations with regard to a failure in nodes or communication paths and the Label Switched Paths (LSPs). In this illustrative case, it may be determined that four LSPs exist between node 110, i.e., A, and node 160, i.e., F. The four LSPs are represented as LSP A-$F_1$, associated with IP addresses 120,250,129,0/24, LSPs A-D and D-F, associated with IP addresses 120,250,0,0/16 and LSP A-$F_2$, associated with IP addresses, 120,250,128,0/24. In addition, a fifth LSP, referred to as LSP A-$F_3$, may be identified as being an LSP "layered-over" LSPs A-D and D-F and represents the concatenation of LSPs A-D and D-F. The three IP address ranges, as previously discussed, may be associated with a service provided by the network and are hereinafter referred to as service 1, service 2, and service 3, respectively.

Returning to FIG. 4a, the behavior relationship of the identified LSPs and the nodes A through F and the communication paths between these nodes may be determined as that LSP affected by an event in a node or path. The behavior relationship illustrates may show the effect on an LSP when a failure, occurs in a related node or path. Thus, in this illustrative example, operations in, for example, node C effects the operations of LSPs D-F, A-$F_2$ and A-$F_3$. Similarly, an operation in communication path C-D affects the same LSPs.

FIG. 4b illustrates a similar exemplary behavior relationship of the network shown in FIG. 1c between the identified LSPs and the services provided. In this case an operation or event in LSP D-F, for example, effects the operation in service 2 but not in services 1 or 3.

Utilizing the information shown in FIGS. 4a and 4b, an impact analysis on the customer or service may be performed with regard to a failure, for example, in either the nodes or communications paths shown in FIG. 1c. For example, a failure in node C has a negative behavior response in LSPs D-F, A-F2 and A-F3 (FIG. 4a) and consequently in services 1 and 2 (FIG. 4b).

In a similar manner, an analysis may be performed to locate the cause of a failure, i.e., root-cause analysis. Root cause analysis is further discussed with regard to U.S. Pat. Nos. 6,249,755, 5,661,668 and 5,528,516, which are incorporated by reference herein. Examples of problems in a root-cause analysis that may be identified in an MPLS VPN network by using the combined models described are tabulated in Table 1.

TABLE 1

Examples of Root-Cause Problems in an MPLS VPN

| Entity | Diagnosis | Explanation |
| --- | --- | --- |
| VPN | Impacted | Connectivity between VPN Peers impaired by connectivity failure in the transport layer |

TABLE 1-continued

Examples of Root-Cause Problems in an MPLS VPN

| Entity | Diagnosis | Explanation |
| --- | --- | --- |
| VRF | Impacted | Connectivity between this VRF and one of its peer VRFs is impaired by connectivity failure in the transport layer |
| LSP | Impacted | Connectivity for this path impaired by connectivity failure in the transport layer |
| LSPHop | Impacted | Connectivity for this LSP Hop impaired by connectivity failure in the transport layer |
| VRF | MidRoutesExceeded | The mid-threshold of VRF routes has been crossed |
| VRF | MaxRoutesExceeded | The maximum number of VRF routes has been reached |
| VPN | MidRoutesExceeded | The mid-threshold of VRF routes for VRFs that are members of this VPN has been crossed |
| VPN | MaxRoutesExceeded | The maximum number of VRF routes for VRFs that are member of this VPN has been reached |

Although the present invention has been shown and described with regard to an impact and root-cause analysis, other forms of analysis may also be performed with regard to the networks represented. These forms of analysis may include, but are not limited to, design, simulation, operations management, event propagation, impact analysis, root-cause analysis of problems, "what if" scenarios, projections and others. Similarly, while the analysis has been shown with regard to MPLS networks and VPNs, the MPLS and VPN models shown herein can be used individually or in combination to determine behavior relationships and perform analysis.

FIG. 5 illustrates an exemplary embodiment of an apparatus or system 500 that may be used for implementing the principles of the present invention. System 500 may contain one or more input/output devices 502, processors 503 and memories 504. I/O devices 502 may access or receive information from one or more sources or devices 501. Sources or devices 501 may be devices such as routers, servers, computers, notebook computer, PDAs, cells phones or other devices suitable for transmitting and receiving information responsive to the processes shown herein. Devices 501 may have access over one or more network connections 550 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 502, processors 503 and memories 504 may communicate over a communication medium 525. Communication medium 525 may represent, for example, a bus, a communication network, one or more internal connections of a circuit, circuit card or other apparatus, as well as portions and combinations of these and other communication media. Input data from the devices 501 may be processed in accordance with one or more computer programs or software that may be stored in memories 504 and executed by processors 503. Memories 504 may be any magnetic, optical or semiconductor medium that is loadable and retains information either permanently, e.g. PROM, or non-permanently, e.g., RAM. Processors 503 may be any means, such as general purpose or special purpose computing system, such as a laptop computer, desktop computer, a server, handheld computer, or may be a hardware configuration, such as dedicated logic circuit, or integrated circuit. Processors 503 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium. The code may also be stored in the memory 504. The code may be read or downloaded from a memory medium 583, an I/O device 585 or magnetic or optical media, such as a floppy disk, a CD-ROM or a DVD, 587 and then stored in memory 504.

Information from device 501 received by I/O device 502, after processing in accordance with one or more software programs operable to perform the functions illustrated herein, may also be transmitted over network 580 to one or more output devices represented as display 585, reporting device 590 or second processing system 595.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for representing a network and performing operations on the represented network, the method comprising the steps of:
creating at least one configuration non-specific object class associated with components of the network, wherein said objects are selected from the group consisting of: LSPTermination, LSPHop, LSPOutSegment, LSPInSegment and wherein the objects LSPOutSegment, LSPInSegment are subclasses of the LSPTermination object; and
creating at least one configuration non-specific representation of relationships among associated object classes, wherein the relationships among the object classes are selected from the group consisting of: PreviousHop/NextHop, SwitchedFrom/SwitchedTo, PreviousHop, FirstHop, NextHop, Connected PE;
representing a behavior relationship among the object classes based on the representations of the relationships among the object classes, wherein said behavior relationship is represented as a mapping of effects of at least one event in selected object classes to events in other selected object classes to allow propagation and elevation of events through relationships of the object classes to higher object class levels;
analyzing properties of the network based on the propagation and elevation of events between the object classes.

2. The method as recited in claim 1, further comprising the step of:
dynamically determining instances of selected ones of the object classes from information provided with regard to the network components.

3. The method as recited in claim 2, wherein said instances of selected ones of object classes are predetermined.

4. The method as recited in claim 1, further comprising the step of:
dynamically determining instances of selected ones of the representations of relationships from information provided with regard to the network components.

5. The method as recited in claim 4, wherein said instances of selected ones of the representations of relationships are predetermined.

6. The method as recited in claim 1 wherein the step of representing the behavior relationship comprises the step of:
propagating a property of an object class through at least one associated representation of a relationship among associated object classes, said propagation being indicated for each of the associated object classes.

7. The method as recited in claim 6 wherein the behavior relationship is selected from a group consisting of: impact, causality, performance and cost.

8. The method as recited in claim 1, wherein the event is associated with an occurrence in at least one of said network components.

9. The method as recited in claim 1, wherein the step of analysis is selected from the group consisting of: impact, root-cause, exception detection, provisioning, configuration, study, performance, costing, capacity planning, design, "what if" scenarios, planning and simulation.

10. The method as recited in claim 9, further comprising the step of:
storing the results of the selected analysis.

11. The method as recited in claim 9, further comprising the step of:
displaying the results of the selected analysis.

12. The method as recited in claim 1, where the object classes are further selected from the group consisting of: RouteTarget, VRF, and VPN.

13. The method as recited in claim 12, wherein the relationships among the object classes are further selected from the group consisting of: ImportedBy/Imports, ExportedBy/Exports, VPNPeer, HubsOf, SpokesOf, and SendsTo/ReceivesFrom.

14. An apparatus for representing a network and performing operations on the represented network, the apparatus comprising:
a processor in communication with a memory, the processor executing code for:
storing at least one configuration non-specific object class associated with components of the network, wherein said objects are selected from the group consisting of: LSPTermination, LSPHop, LSPOutSegment, LSPIn- Segment and wherein the objects LSPOutSegment, LSPInSegment are subclasses of the LSPTermination object; and storing at least one configuration non-specific representation of relationships among associated object classes, wherein the relationships among the object classes are selected from the group consisting of: PreviousHop/NextHop, SwitchedFrom/SwitchedTo, PreviousHop, FirstHop, NextHop, Connected PE;

representing a behavior relationship among the object classes based on the representations of the relationships among the object classes, wherein said behavior relationship is represented as a mapping of effects of at least one event in selected object classes to events of other selected object classes to allow propagation and elevation of events through relationships of the object classes to higher object class levels;

analyzing properties of the network based on the propagation and elevation of events between the object classes.

15. The apparatus as recited in claim 14, the processor further executing code for:

dynamically determining instances of selected ones of the object classes from information provided with regard to the network components.

16. The apparatus as recited in claim 15, wherein said instances of selected ones of object classes are predetermined.

17. The apparatus as recited in claim 14, the processor further executing code for:

dynamically determining instances of selected ones of the representations of relationships from information provided with regard to the network components.

18. The apparatus as recited in claim 17, wherein said instances of selected ones of the representations of relationships are predetermined.

19. The apparatus as recited in claim 14, the processor further executing code for:

propagating a property of an object class through at least one associated representation of a relationship among associated object classes, said propagation being indicated for each of the associated object classes.

20. The apparatus as recited in claim 19 wherein the behavior relationship is selected from a group consisting of: impact, causality, performance and cost.

21. The apparatus as recited in claim 14, wherein the event is associated with an occurrence in at least one of said network components.

22. The apparatus as recited in claim 14, the processor further executing code for:

performing an analysis is selected from the group consisting of: impact, root-cause, exception detection, provisioning, configuration, study, performance, costing, capacity planning, design, "what if" scenarios, planning and simulation.

23. The apparatus as recited in claim 22, the processor further executing code for:

storing the results of the selected analysis.

24. The apparatus as recited in claim 23, the processor further executing code for:

displaying the results of the selected analysis.

25. The apparatus as recited in claim 14, where the object classes are further selected from the group consisting of: RouteTarget, VRF, and VPN.

26. The apparatus as recited in claim 25, wherein the relationships among the object classes are further selected from the group consisting of: ImportedBy/Imports, ExportedBy/Exports, VPNPeer, HubsOf, SpokesOf, and SendsTo/ReceivesFrom.

27. The apparatus as recited in claim 14, further comprising:

An I/O device in communication with the processor and the memory.

28. The apparatus as recited in claim 14, wherein the code is stored in the memory.

29. A computer read-able storage medium containing code for representing a network and performing operations on the represented network, the code providing instructions to a computer system for executing the steps of:

storing at least one configuration non-specific object class associated with components of the network, wherein said objects are selected from the group consisting of: LSPTermination, LSPHop, LSPOutSegment, LSPInSegment and wherein the objects LSPOutSegment, LSPInSegment are subclasses of the LSPTermination object; and storing at least one configuration non-specific representation of relationships among associated object classes, wherein the relationships among the object classes are selected from the group consisting of: PreviousHop/NextHop, SwitchedFrom/SwitchedTo, PreviousHop, FirstHop, NextHop, Connected PE;

representing a behavior relationship among the object classes based on the representations of the relationships among the object classes, wherein said behavior relationship is represented as a mapping of effects of at least one event in selected object classes to events of other selected object classes to allow propagation and elevation of events through relationships of the object classes to higher object class levels;

analyzing properties of the network based on the propagation and elevation of events between the object classes.

30. A computer-readable storage medium as recited in claim 29, the processor further executing code for:

dynamically determining instances of selected ones of the object classes from information provided with regard to the network components.

31. A computer-readable storage medium as recited in claim 30, wherein said instances of selected ones of object classes are predetermined.

32. A computer-readable storage medium as recited in claim 29, the processor further executing code for:

dynamically determining instances of selected ones of the representations of relationships from information provided with regard to the network components.

33. A computer-readable storage medium as recited in claim 32, wherein said instances of selected ones of the representations of relationships are predetermined.

34. A computer-readable storage medium as recited in claim 29 wherein the step of representing the behavior relationship comprises the step of:

propagating a property of an object class through at least one associated representation of a relationship among object classes.

35. A computer-readable storage medium as recited in claim 34 wherein the behavior relationship is selected from a group consisting of: impact, causality, performance and cost.

36. A computer-readable storage medium as recited in claim 29, wherein the event is associated with an occurrence in at least one of said network components.

37. A computer-readable storage medium as recited in claim 29, wherein code further providing instructions to a computing system for executing the step of: performing an analysis is selected from the group consisting of: impact, root-cause, exception detection, provisioning, configuration, study, performance, costing, capacity planning, design, "what if" scenarios, planning and simulation.

38. A computer-readable storage medium as recited in claim 37, wherein the code further providing instructions to a computing system for executing the steps of:

storing the results of the selected analysis.

39. A computer-readable storage medium as recited in claim 38, wherein the code further providing instructions to a computing system for executing the steps of:

displaying the results of the selected analysis.

40. A computer-readable storage medium as recited in claim 29, where the object classes are further selected from the group consisting of: RouteTarget, VRF, and VPN.

41. A computer-readable storage medium as recited in claim 40, wherein the relationships among the object classes are further selected from the group consisting of: ImportedBy/Imports, ExportedBy/Exports, VPNPeer, HubsOf, SpokesOf, and SendsTo/ReceivesFrom.

* * * * *